(12) United States Patent
Okamoto (10) Patent No.: US 8,081,379 B2
(45) Date of Patent: Dec. 20, 2011

(54) SCREEN AND PROJECTION SYSTEM FOR REDUCING EFFECTS OF AMBIENT LIGHT

(75) Inventor: Junichi Okamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/862,139

(22) Filed: Aug. 24, 2010

(65) Prior Publication Data

US 2011/0090560 A1 Apr. 21, 2011

(30) Foreign Application Priority Data

Oct. 15, 2009 (JP) .................................. 2009-238415

(51) Int. Cl.
*G03B 21/56* (2006.01)
*G03B 21/00* (2006.01)

(52) U.S. Cl. ........................... 359/443; 359/449; 353/84

(58) Field of Classification Search .................. 313/504; 353/84; 359/449, 460, 584, 443, 455; 349/112; 250/343
See application file for complete search history.

(56) References Cited

U.S. PATENT DOCUMENTS

| | | | |
|---|---|---|---|
| 6,144,491 A * | 11/2000 | Orikasa et al. ................ | 359/452 |
| 6,381,068 B1 * | 4/2002 | Harada et al. ................ | 359/443 |
| 6,411,436 B1 * | 6/2002 | Kikuchi ........................ | 359/460 |
| 6,987,610 B2 * | 1/2006 | Piehl ............................. | 359/443 |
| 7,030,555 B2 * | 4/2006 | Nakamura et al. ............ | 313/504 |
| 7,035,006 B2 * | 4/2006 | Umeya et al. ................. | 359/443 |
| 7,040,764 B2 * | 5/2006 | Przybyla et al. .............. | 353/84 |
| 7,525,606 B2 * | 4/2009 | Stephenson, III ............. | 349/40 |
| 2007/0035827 A1 * | 2/2007 | Shimoda et al. .............. | 359/449 |
| 2007/0097509 A1 * | 5/2007 | Nevitt et al. .................. | 359/584 |

FOREIGN PATENT DOCUMENTS

| JP | A-2002-107828 | 4/2002 |
|---|---|---|
| JP | A-2006-317832 | 11/2006 |

* cited by examiner

*Primary Examiner* — Clayton E Laballe
*Assistant Examiner* — Kevin Butler
(74) *Attorney, Agent, or Firm* — Oliff & Berridge, PLC (57) ABSTRACT

A screen includes: a base material; and a pigmented layer provided on one surface of the base material, the pigmented layer including a first pigment that absorbs a visible light component contained in room light, and a second pigment that absorbs ultraviolet light, wherein the second pigment absorbs the ultraviolet light contained in sunlight, and varies the color imparted by a remaining visible light component unabsorbed by the first pigment absorbing the visible light component of the sunlight, the color being varied in such a manner as to reduce the absolute value of a color difference on a chromaticity diagram between a white point and a point indicative of the color imparted by the remaining component.

14 Claims, 5 Drawing Sheets

SCREEN AND PROJECTION SYSTEM FOR REDUCING EFFECTS OF AMBIENT LIGHT

BACKGROUND

1. Technical Field

The present invention relates to screens and projection systems.

2. Related Art

Various types of screens are available as projection screens used with projectors (projection-type display apparatuses) to display large images in presentations such as in exhibitions and conferences, including academic conference, or in screening of videos such as in home theaters.

However, there is a problem in these types of screens. For example, in a reflection-type screen, the ambient outside light such as illumination light and window sunlight is also reflected in reflecting the projected light from a projector to display a projection image. Accordingly, the contrast, or the luminance ratio between white (maximum luminance) and black (minimum luminance) becomes low in a bright environment, and it is difficult to display a clear image.

In an effort to develop a screen that can achieve high contrast even under bright settings, there have been attempts to reduce the minimum luminance by suppressing the adverse effect of contrast-lowering outside light such as sunlight and illumination light. This type of screen is proposed in, for example, JP-A-2002-107828 (Patent Document 1) and JP-A-2006-317832 (Patent Document 2), in which a light absorbing layer that includes a light absorbing dye or pigment is provided to absorb unnecessary outside light.

Ordinary screens are provided with a light diffusing layer that diffuses light to increase the viewing angle. Regarding such screens, Patent Document 2 points out the adverse effect caused by the reflected light of the light diffusing layer on the image quality of a projection image. Specifically, the publication points to the wavelength dependency of the intensity of the reflected light at the light diffusing layer as the cause of an incorrect white balance in the light reflected by the light diffusing layer, and thus in the projection image.

To overcome this problem, Patent Document 2 proposes providing a light absorbing layer on the back side (opposite from the viewing side) of the light diffusing layer disposed on the viewing side to make the absorbance of the light absorbing layer larger on the longer wavelength side (toward the red) and smaller on the shorter wavelength side (toward the blue) and thus cancel out the intensity distribution of the reflected light at the light diffusing layer and improve white balance.

However, the screen structures described in the foregoing publications are for solving the low contrast caused by one kind of outside light, such as illumination light in airplane (Patent Document 1), and room illumination such as a fluorescent lamp (Patent Document 2). Neither publication makes a thorough assessment regarding problems that might occur when unintended outside light falls on the screen.

A representative example of such unintended outside light sunlight. When a screen is used in a room with a window, sunlight may fall on the screen through the window with an angle different from the incident angle of the room illumination, with the result that the contrast is reduced.

Unlike the fluorescent lamp and other types of room illumination identified as a problem in the related art, sunlight contains the whole range of light in the visible light region. Thus, when the screen is adapted to suppress a contrast drop by, for example, selectively absorbing the wavelengths of room illumination, the screen also removes a part of sunlight at the wavelengths corresponding to the specific wavelengths of the room illumination upon incidence of sunlight, which contains the whole range of light in the visible light region. The remaining component of the sunlight imparts color.

The coloring that occurs on the screen in this manner disrupts the white balance of the projection image, and deteriorates image quality. The foregoing publications do not take any measure against such an anticipated problem.

SUMMARY

An advantage of some aspects of the invention is to provide a screen with which a high-contrast image can be obtained with the maintained white balance. Another advantage is to provide a projection system that includes such a screen.

According to an aspect of the invention, there is provided a screen that includes: a base material; and a pigmented layer provided on one surface of the base material, the pigmented layer including a first pigment that absorbs a visible light component contained in room light, and a second pigment that absorbs ultraviolet light, wherein the second pigment absorbs the ultraviolet light contained in sunlight, and varies the color imparted by a remaining visible light component unabsorbed by the first pigment absorbing the visible light component of the sunlight, the color being varied in such a manner as to reduce the absolute value of a color difference on a chromaticity diagram between a white point and a point indicative of the color imparted by the remaining component.

As used herein, the "room light" refers to an artificial light source used for room illumination such as a fluorescent lamp and an LED illumination. In the screen according to the aspect of the invention, the outside light component that originates from room light can be absorbed and reduced by the first pigment.

Room light and sunlight have different emission spectra. The emission spectrum of sunlight is continuous throughout the visible light region. Thus, the absorption of the visible light component of sunlight at the same wavelengths as the wavelengths of the room light by the first pigment leaves a remaining visible light component not absorbed by the first pigment. The unabsorbed remaining component may mix and impart color. Such coloring can be a cause of image deterioration in the projection image.

In the screen according to the aspect of the invention, the second pigment absorbs the ultraviolet light contained in sunlight, and undergoes reaction to render the imparted color of the sunlight remaining component more white. Coloring due to sunlight can be suppressed in this manner with the second pigment, even when sunlight falls on the screen. Another way of saying "to render more white" is to reduce the absolute value of the color difference between the white point and the point indicative of the color imparted by the remaining component of sunlight on the chromaticity diagram.

Some artificial light sources emit ultraviolet light. However, changes which may be caused by the reaction of the second pigment only with the room light in the absence of sunlight are limited, and the coloring problem is unlikely to occur, because the quantity of the emitted ultraviolet light is much smaller than the ultraviolet light quantity in sunlight.

Thus, according to the foregoing configuration, the adverse effect of outside light can be desirably reduced even under the room light and sunlight, and a screen with the maintained white balance and desirably improved projection image contrast can be provided.

In the aspect of the invention, it is preferable that the second pigment absorb the ultraviolet light, and emit light of a waveband responsible for a complementary color of the color imparted by the remaining component.

According to this configuration, the color of the light emitted by the second pigment upon absorbing the ultraviolet light contained in sunlight mixes with the color imparted by the remaining component of the sunlight to render the screen more white. In this way, coloring can be suppressed, and the contrast of the projection image can be improved.

In the aspect of the invention, it is preferable that the second pigment absorb the ultraviolet light, and absorb light of a wavelength of the same waveband as the waveband responsible for the color imparted by the remaining component.

According to this configuration, the second pigment that has absorbed the ultraviolet light contained in sunlight has an absorption band in the visible light region, and the absorption band is in the wavelength band of the color imparted by the remaining component of the sunlight. Thus, the visible light component of sunlight is first absorbed partly by the first pigment, and a part of the unabsorbed remaining component is absorbed by the second pigment. As a result, the remaining component of sunlight not absorbed by the pigmented layer is rendered more white. In this way, coloring on the screen can be suppressed, and the contrast of the projection image can be improved.

In the aspect of the invention, it is preferable that the first pigment, and the second pigment after absorbing the ultraviolet light have absorption peaks different from a peak wavelength of light emitted by a projector projecting an image on the screen.

According to this configuration, because the pigmented layer does not absorb the light forming a projection image, the outside light can be selectively absorbed while desirably maintaining the white balance of the projection image. In this way, the contrast of the projection image can be improved.

In the aspect of the invention, it is preferable that the pigmented layer include a first pigmented layer that includes the first pigment, and a second pigmented layer that includes the second pigment.

According to this configuration, the quantity of light absorbed in each layer can easily be balanced by varying the pigment density in the first and second pigmented layers and the layer thickness in each pigmented layer. In this way, designing is made easier.

In the aspect of the invention, it is preferable that a light diffusing layer that diffuses incident light be provided between the base material and the pigmented layer.

According to this configuration, the incident light can be diffused. This enables the intensity distribution of the projected light to be averaged on the screen surface, and prevents the "hot spot" phenomenon, in which a part of the projection image appears bright. Further, by the provision of the light diffusing layer between the base material and the pigmented layer, the outside light always passes through the pigmented layer, even when, for example, the incident outside light on the viewing side undergoes backscattering on the surface of the light diffusing layer. In this way, the outside light can be effectively absorbed by the pigment contained in the pigmented layer, and a high image-quality screen can be provided.

According to another aspect of the invention, there is provided a projection system that includes the screen of the aspect of the invention, and a projector that projects an image on the screen.

According to this configuration, a uniform, bright projection image can be obtained even when a low-output projector PJ is used in a bright room, and, because the image can be displayed with the maintained white balance, a projection system PS can be realized that can operate at low power while maintaining image quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A screen and a projection system according to First Embodiment of the invention are described below with reference to FIG. 1 to FIG. 4. Note that, for simplicity, the dimensions of the constituting elements in the drawings are not in scale.

Figure 1:
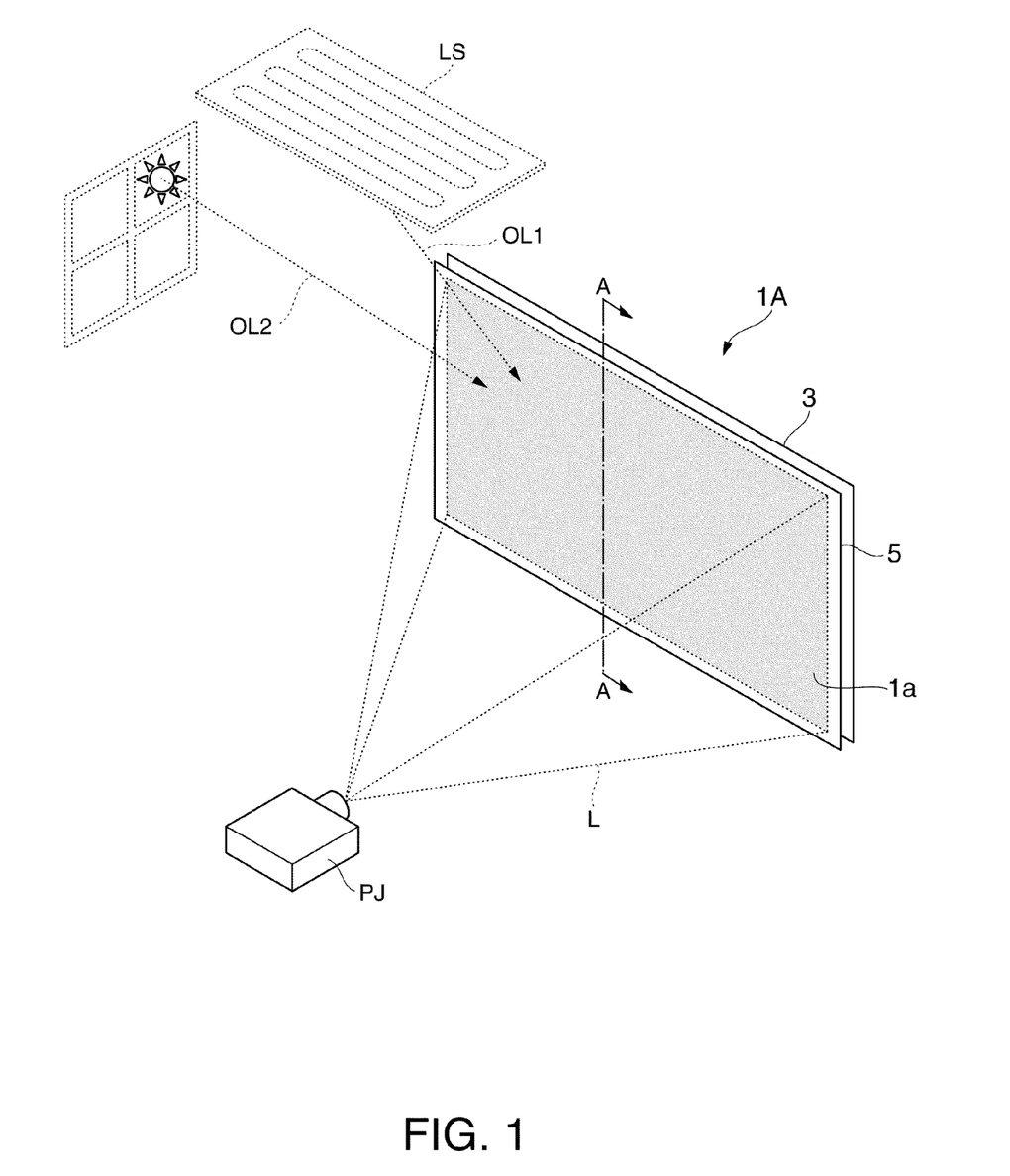
FIG. 1 is a perspective view of a screen and a projection system of First Embodiment of the invention.

FIG. 1 is a perspective view illustrating a screen 1A and a projection system PS of the present embodiment.

As illustrated in the figure, the screen 1A of the present embodiment is of a reflection-type, and includes a projection surface 1a; a pigmented layer 5 formed on the projection surface 1a, and that includes pigments that absorb outside light OL1 and OL2; and a reflecting layer 3 provided on the back side of the pigmented layer 5 (opposite from the viewing side). The outside light OL1 is light that originates from a room illumination LS. The outside light OL2 is sunlight.

The screen 1A has a horizontally long, rectangular planar shape, and reflects back the projected light L from a projector PJ. The projector PJ is a projection-type display apparatus that projects the projected light L onto the screen 1A. In this embodiment, the projector PJ is a near projector disposed downward in front of the screen 1A. The screen 1A and the projector PJ constitute the projection system PS.

The screen 1A enables high-contrast image display by desirably reflecting back the projected light L off the projection surface 1a, and by absorbing the outside light OL1 and OL2 in the pigmented layer 5. This is described below in more detail.

Figure 2:
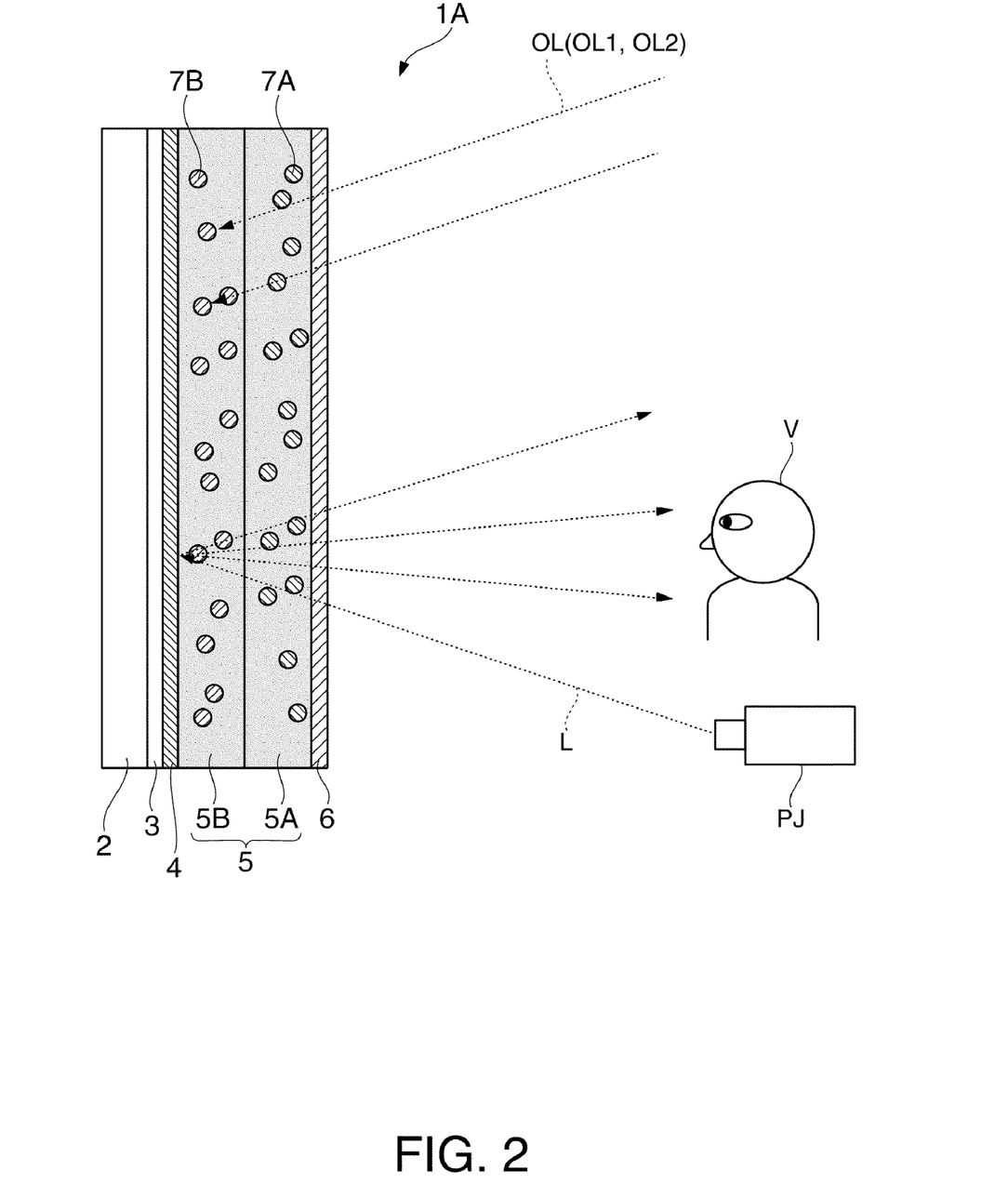
FIG. 2 is an explanatory diagram of the screen of First Embodiment of the invention.

FIG. 2 is an explanatory diagram of the screen 1A, showing a cross section taken at A-A' of FIG. 1.

As illustrated in the figure, the screen 1A includes the reflecting layer 3 provided on a base material 2; a light diffusing layer 4 provided on the reflecting layer 3; the pigmented layer 5 provided over the light diffusing layer 4 on the viewing side; and an anti-reflective layer 6 provided on the front over the pigmented layer 5. The pigmented layer 5 has a laminate structure including a first pigmented layer 5A provided on the side of the anti-reflective layer 6, and a second pigmented layer 5B provided on the side of the reflecting layer 3. An adhesive layer (not illustrated) may be provided between the layers.

The base material 2 is formed using a black light-absorbing material that contains a light-absorbing filler and a binder resin. The filler absorbs natural light or white light, and includes a pigment such as carbon black, or black pigment particles. The binder resin is a thermoplastic resin, preferably an elastic thermoplastic elastomer. Specifically, a urethane resin, a polyolefinic resin, or a vinyl chloride resin is preferably used. In addition to the filler and the binder resin, the base material 2 may also include additives such as a hardener, an antistatic agent, and a stainproofing agent, or a ultraviolet absorber that prevents deterioration of the binder resin.

The base material 2 may be provided on a support member (not illustrated). The support member is flexible film, such as polyethylene terephthalate (PET), polyethylene naphthalate (PEN), and polycarbonate (PC). A member, for example, such as an aluminum composite board may be attached to the back side of the support member (the side opposite from the base material 2) to improve the strength of the screen 1A.

The reflecting layer 3 can be formed using light-reflective materials used for common screens. For example, metallic material such as aluminum and silver can be used to form the reflecting layer 3, using a gas phase method such as a vapor-deposition method, or a liquid phase method such as a spraying method that uses a binder resin ink containing metallic microparticles dispersed in the resin.

The light diffusing layer 4 serves as a deflector, diffusing the projected light L to increase the horizontal viewing angle. The material of the light diffusing layer 4 may be that which includes a filler (diffusing agent) dispersed in a colorless translucent binder resin. The filler may be bead- or scale-like in shape, and may be made of material such as silica, titanium oxide, mica, barium sulfate, barium chloride, and aluminum.

In the light diffusing layer 4, it is preferable that the binder resin and the filler be both translucent, in order to allow the projected light L from the projector PJ to pass through the layer and be reflected at the reflecting layer 3 back into the layer for another passage. It is therefore preferable to use translucent material such as silica for the filler. With the filler content relatively small, a non-translucent or semi-translucent filler can be used.

Translucent urethane resin or acrylic resin is preferably used as the binder resin of the light diffusing layer 4.

The first pigmented layer 5A contains a first pigment 7A that has a maximum absorption wavelength in the visible light region. The first pigment 7A functions to absorb the visible light component of the outside light OL incident on the screen 1A. The visible light absorbed by the first pigment 7A is set based on the wavelength of the outside light OL1 that originates from a room illumination, and the first pigment 7A has an absorption wavelength band in the region that overlaps with the peak wavelength of the outside light OL1.

Preferably, the first pigment 7A has an absorption wavelength band with an absorption peak at a position that does not overlap with the bright-line spectrum of the light source of the projector PJ. Specifically, the first pigment 7A preferably has a spectrum that absorbs light at the wavelength other than the emission wavelength of the projected light L. Because of such an absorption spectrum of the first pigment 7A, the first pigmented layer 5 can absorb and reduce the outside light OL1 while allowing the projected light L to desirably pass through.

The material of the first pigmented layer 5A may be such that the first pigment 7A is dispersed in a colorless translucent binder resin. The first pigmented layer 5A uses the first pigment 7A as an absorbing component that absorbs the visible light component of the outside light OL. Preferable examples of the binder resin include a translucent urethane resin or a translucent acrylic resin.

The second pigmented layer 5B includes a second pigment 7B that has a maximum absorption wavelength in the ultraviolet region. The second pigment 7B functions to fluoresce by being excited upon absorption of the ultraviolet light contained in the outside light OL2 originating from sunlight. The second pigment 7B is set so that, upon absorbing the ultraviolet light, it develops a complementary color of the color imparted by the part of the visible light component of sunlight that was not absorbed by the first pigment 7A.

The second pigment 7B may be a fluorescent pigment (fluorescent material) that emits visible light by being excited by the ultraviolet light. Examples of such fluorescent pigments include inorganic materials, such as ZnS:Ag, ZnS:Al, $(SrCaBaMg)_5(PO_4)_3Cl$:Eu, and $BaMgAl_{10}O_{17}$:Eu for blue, ZnS:Cu, ZnS:Al, $LaPO_4$:Ce, $LaPO_4$:Tb, and $Zn_2SiO_4$:Mn for green, and $Y_2O_2S$:Eu, $Y_2O_3$:Eu, $YBO_3$:Eu, and $GdBO_3$:Eu for red. Organic fluorescent pigments also can be used.

As with the first pigmented layer 5A, the material of the second pigmented layer 5B may be such that the second pigment 7B is dispersed in a colorless translucent binder resin. Preferable examples of the binder resin include a translucent urethane resin or a translucent acrylic resin, as in the first pigmented layer 5A.

The first pigment 7A or the second pigment 7B may be one kind of pigment, or a mixture of more than one kind of pigment. When used as a mixture of more than one kind, the first pigment 7A and the second pigment 7B can desirably absorb light of different wavelengths.

The anti-reflective layer 6 is, for example, a laminate of alternately disposed two kinds of flexible transparent materials, such as resin, having different refractive indices. The anti-reflective layer 6 may adopt a commonly known structure, and the refractive indices of the layers forming the anti-reflective layer 6 are adjusted to prevent reflection of the projected light L or outside light OL on the surface of the first pigmented layer 5A. The surface of the anti-reflective layer 6 is the projection surface 1a of the screen 1A.

The functions of the screen 1A with the pigmented layer 5 are described below with reference to FIG. 4. First, underlying problems will be described with reference to FIG. 3.

Figure 3:
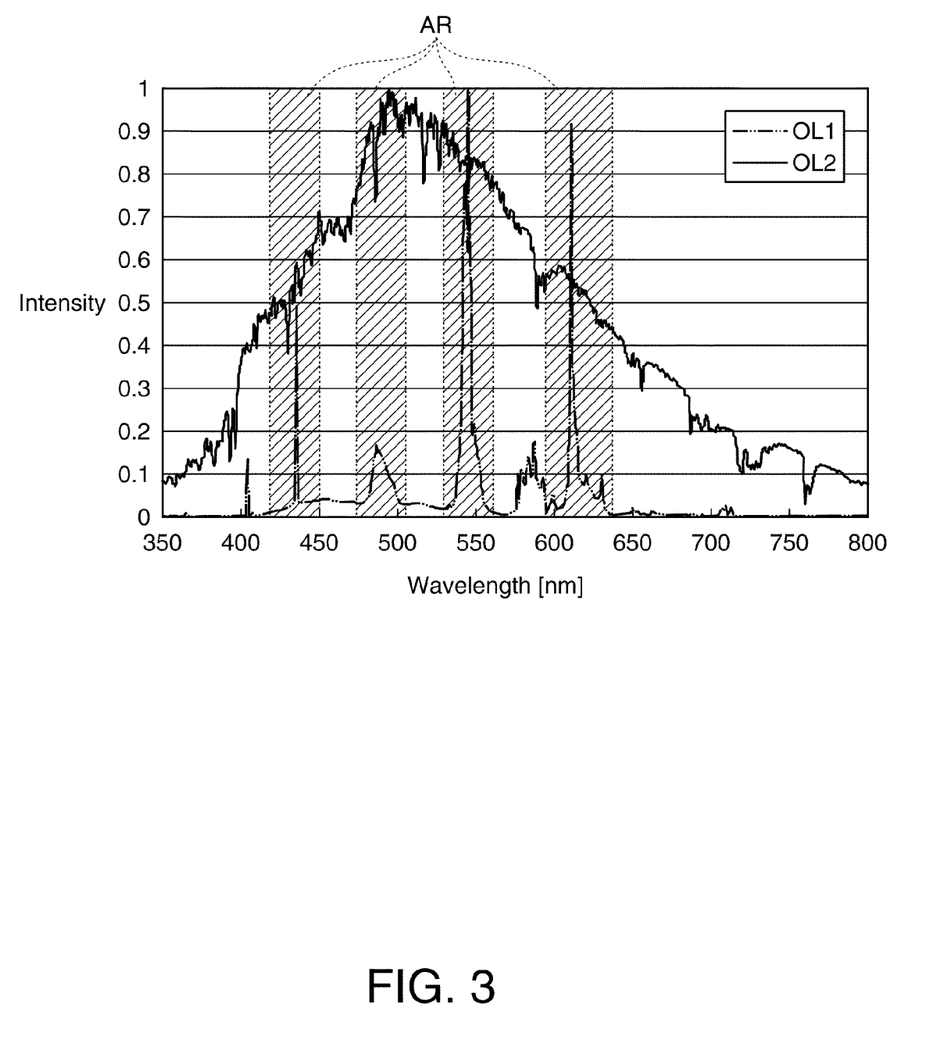
FIG. 3 is a diagram representing the emission spectra of a fluorescent lamp and sunlight.

FIG. 3 is a diagram representing emission spectra of a fluorescent lamp and sunlight. When the outside light OL1 from a room illumination is light from a fluorescent lamp, the first pigment 7A is set to have absorption wavelength bands in the wavelength bands indicated by symbol AR. When sunlight (outside light OL2) is incident on the first pigmented layer 5A including the first pigment 7A of such characteristics, a part of the visible light component of the sunlight is absorbed, and the unabsorbed part of the visible light component imparts color.

This is because the color perceived by humans is determined by the product (tristimulus value) of the spectral distribution of light, the spectral transmittance of the material irradiated by light, and the spectral sensitivity of the human eye. Specifically, the color appears green under the incident sunlight (outside light OL2), even when the first pigment 7A is set to produce a grey color (achromatic color) on the screen under fluorescent light (outside light OL1).

To prevent such coloring under the incident sunlight, the second pigment 7B uses a fluorescent pigment that absorbs ultraviolet light, and fluoresces a complementary color of the color imparted under the incident sunlight (green in this example).

Figure 4:
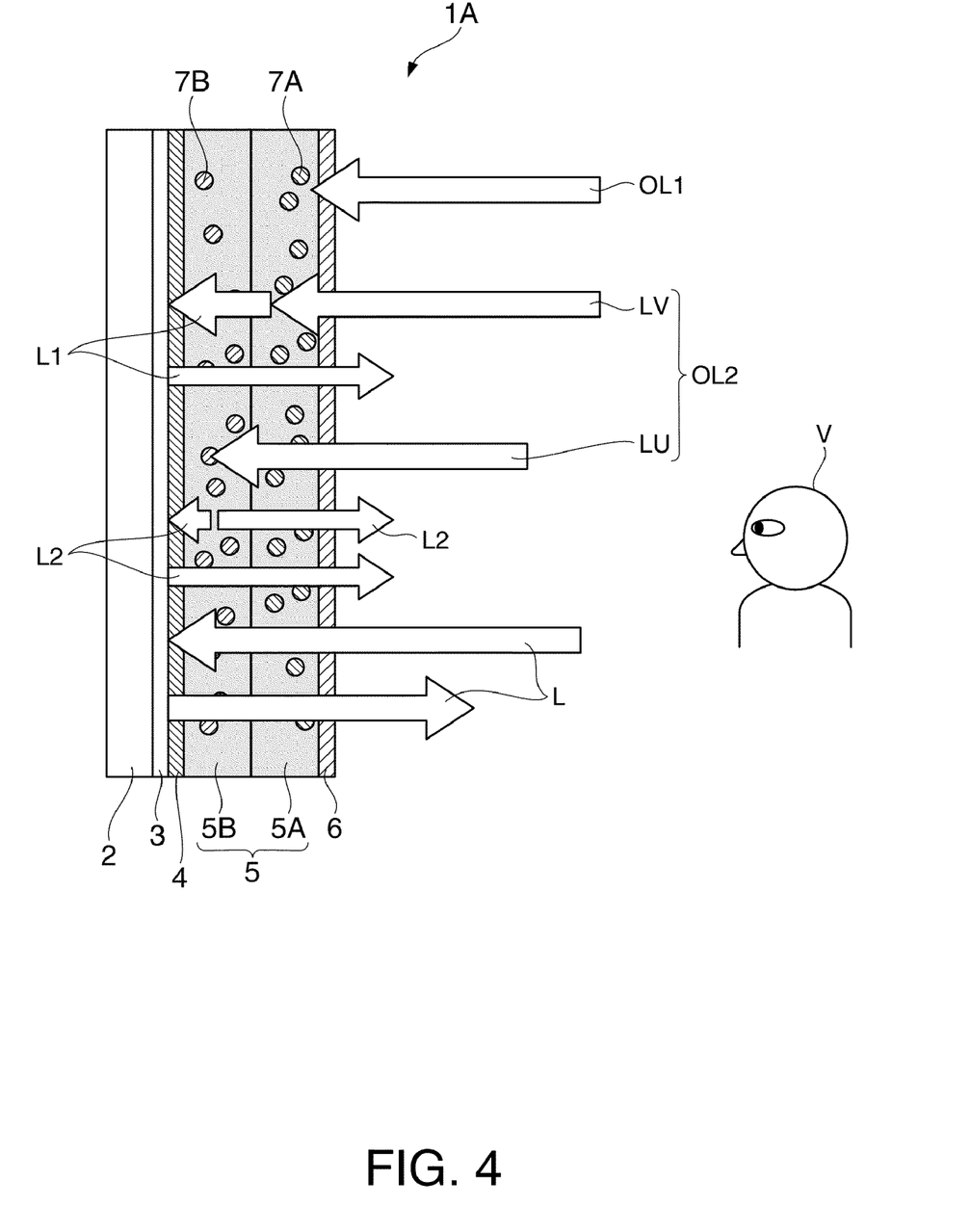
FIG. 4 is an explanatory diagram explaining the function of the screen of First Embodiment of the invention.

FIG. 4 is an explanatory diagram explaining the functions of the screen 1A and corresponds to the FIG. 2. The projected light L of the image projected on the screen 1A by the projector PJ travels through the anti-reflective layer 6, the first pigmented layer 5A, and the second pigmented layer 5B before being reflected by the reflecting layer 3. Because the first pigment 7A and the second pigment 7B have such absorption spectra as to absorb wavelengths other than the emission wavelength of the projected light L, the projected light L passes through the first pigmented layer 5A and the second pigmented layer 5B, and is reflected back to observer V through these layers, without being substantially absorbed by the first pigment 7A and the second pigment 7B.

In contrast, the outside light OL1 in outside light OL is partly absorbed by the first pigment 7A in the first pigmented layer 5A upon reaching the first pigmented layer 5A through the anti-reflective layer 6. The outside light OL1 passed the first pigmented layer 5A is reflected by the reflecting layer 3 back into the first pigmented layer 5A to be absorbed again by the first pigment 7A. In this way, the adverse effect of the outside light OL1 can be desirably reduced, and a contrast drop can be suppressed.

The visible light component LV contained in the outside light OL2 is absorbed at the wavelength that overlaps with the absorption wavelength band of the first pigment 7A as it passes through the first pigmented layer 5A via the anti-reflective layer 6. As a result, the unabsorbed remaining component (color light L1) of the visible light component LV is reflected by the reflecting layer 3 into the observer V. A part of the color light L1 may be absorbed on its way back through the first pigmented layer 5A off the reflecting layer 3, though not illustrated.

The ultraviolet light component LU contained in the outside light OL2 is partly absorbed by the second pigment 7B upon reaching the second pigmented layer 5B. Upon absorbing the ultraviolet light, the second pigment 7B emits color light L2 complementary to the color light L1. Some of the color light L2 travels directly toward the observer V, while the remaining part travels toward the reflecting layer 3, and is reflected to the observer V.

Thus, the observer V faces the color light L1 and the color light L2, which are chromatically complementary to each other, and have light quantities reduced from the outside light OL2. By mixing with the color light L2, the color imparted by the color light L1 as the remaining component of sunlight appears white.

Here, the color and the light quantity of the color light L2 are controlled so as to reduce the absolute value of the distance (color difference) between the coordinates of each color (the color light L1, or the mixture of the color light L1 and the color light L2) and the coordinates of a white point on a chromaticity diagram. With a reduced absolute value of the color difference, the second pigment 7B is considered as being effectively suppressing an incorrect white balance.

The type and amount of the second pigment 7B can be set so that the coordinates of the mixed light renders a color that satisfies the reference "whiteness level" defined by, for example, a predetermined range of color differences from the white point on a chromaticity diagram for designing purposes.

With the pigmented layer 5, the observer V does not notice any coloring due to outside light, and the adverse effect of the outside light OL2 can be desirably reduced to suppress a contrast drop.

With the screen 1A of the foregoing configuration, high-quality image display can be realized with the maintained white balance and desirably improved contrast in a projection image.

Further, with the projection system PS using the screen 1A, a uniform, bright projection image can be obtained even when a low-output projector PJ is used in a bright room, and the image can be displayed with the maintained white balance. The projection system PS is therefore capable of operating at low power while maintaining image quality.

In the present embodiment, the first pigmented layer 5A is described as being formed on the side of the anti-reflective layer 6. However, the positions of the first pigmented layer 5A and the second pigmented layer 5B in the laminate may be reversed to provide the second pigmented layer 5B on the side of the anti-reflective layer 6.

When the first pigmented layer 5A and the second pigmented layer 5B are laminated as in the present embodiment, the excitation light (fluorescence) emitted by the second pigment 7B passes through the first pigmented layer 5A, and therefore a part of the excitation light from the second pigment 7B is absorbed by the first pigmented layer 5A. While this helps improve color purity, it requires selection of a pigment amount, or a pigment with high emission efficiency, in order to ensure a sufficient quantity of excitation light.

When laminated in the reversed order, the amount of pigment can be reduced. However, delicate adjustment of a pigment amount, and adjustment of the emission wavelength are necessary to improve color purity.

Knowing these advantages and disadvantages, a screen of desired characteristics can be obtained by appropriately selecting the order of lamination.

The first pigmented layer 5A and the second pigmented layer 5B are not necessarily required to be discrete layers, and may be provided as a single pigmented layer 5 that includes the first pigment 7A and the second pigment 7B.

Preferably, the second pigmented layer 5B has an absorption wavelength band in the wavelength band that does not absorb the rays of projected light L.

In the present embodiment, the screen 1A is described as being a reflection-type screen. However, the invention is also applicable to a transmission-type screen.

Second Embodiment

Figure 5:
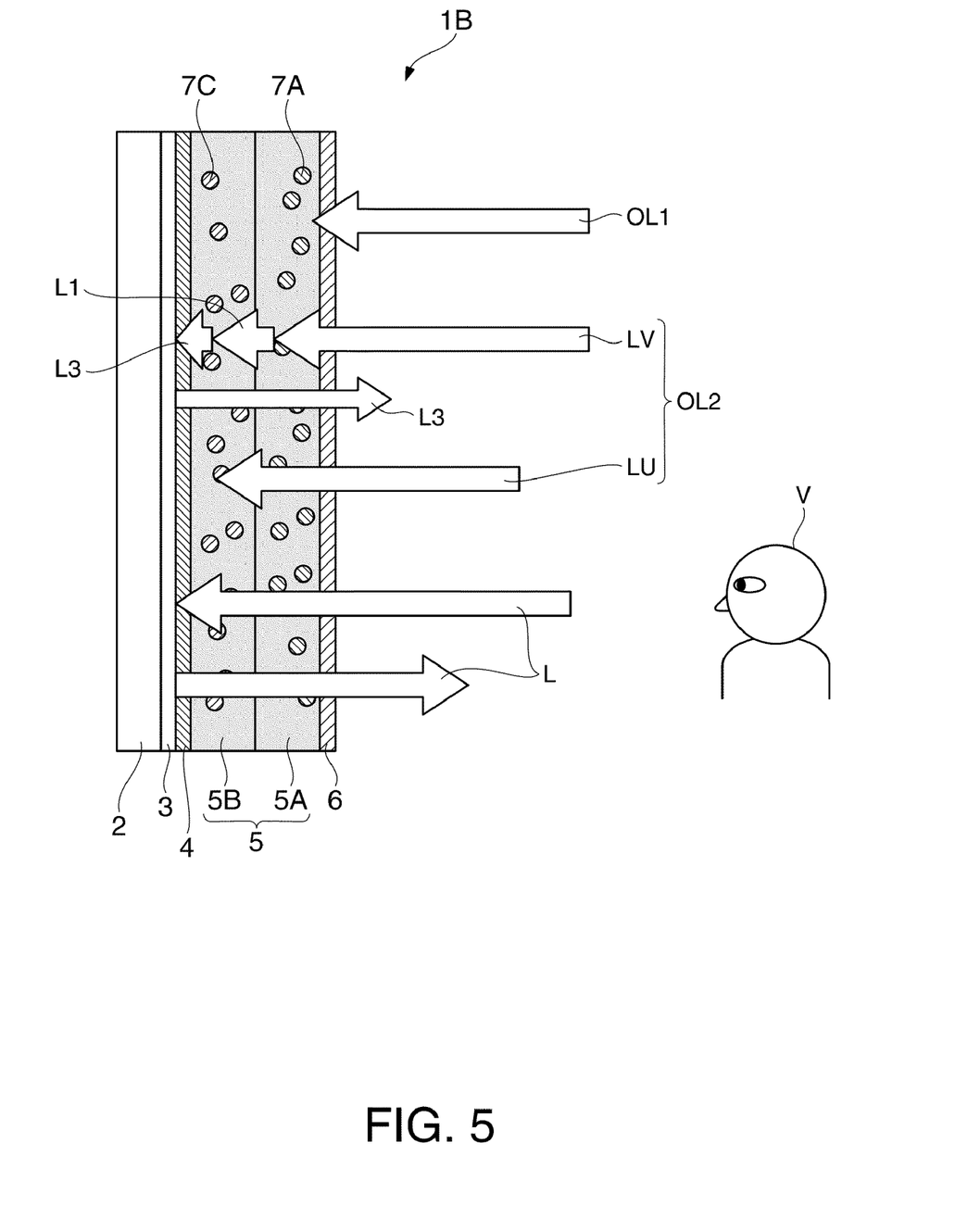
FIG. 5 is an explanatory diagram explaining the function of a screen of Second Embodiment of the invention.

FIG. 5 is an explanatory diagram of a screen 1B according to Second Embodiment of the invention. The screen 1B of the present embodiment is partly in common with the screen 1A of the First Embodiment. The difference lies in the properties of the second pigment. Accordingly, the constituting elements common to those described in First Embodiment are given the same reference numerals, and explanations thereof are omitted.

The explanatory diagram of the screen 1B shown in FIG. 5 corresponds to FIG. 4 of First Embodiment. The second pigment 7C in the second pigmented layer 5B of the screen 1B absorbs the ultraviolet light contained in the outside light OL2 originating from sunlight, and undergoes a change in molecular structure so as to have an absorption band in the visible light region.

For example, photochromic substances, for example, such as a spiro-oxazine compound can be used as the second pigment 7C. The second pigment 7C is set so that, upon absorbing the ultraviolet light, it shows an absorption band in the waveband responsible for the color imparted by part of the visible light component of sunlight not absorbed by the first pigment 7A.

The visible light component LV of the outside light OL2 incident on the screen 1B is absorbed at the wavelength that overlaps with the absorption wavelength band of the first pigment 7A as it passes through the first pigmented layer 5A, and the remaining component is incident on the second pigmented layer 5B as the color light L1.

The ultraviolet light component LU contained in the outside light OL2 is partly absorbed by the second pigment 7B upon reaching the second pigmented layer 5B. The second pigment 7B that has absorbed the ultraviolet light has an absorption band in the waveband responsible for the color imparted by the color light L1. Thus, the second pigment 7B that has absorbed the ultraviolet light absorbs part of the color light L1 incident on the second pigmented layer 5B, so as to change the color light L1 to white light L3.

Thus, the observer V faces the white light L3, and does not notice coloring due to outside light. The adverse effect of the outside light OL2 can thus be desirably reduced, and a contrast drop can be suppressed.

High-quality image display with the maintained white balance and desirably improved contrast in the projection image also can be realized with the screen 1B of the foregoing configuration.

The invention has been described with respect to certain preferred embodiments with reference to the accompanying drawings. However, the invention is in no way limited to the foregoing embodiments. The various shapes and combinations of the constituting members and other features described above are merely examples, and can be altered in many ways according to design requirements or as may be required without departing from the scope of the present invention.

The entire disclosure of Japanese Patent Application No. 2009-238415, filed Oct. 15, 2009 is expressly incorporated by reference herein.

What is claimed is:

1. A screen comprising:
a base material; and
a pigmented layer provided on one surface of the base material,
the pigmented layer including a first pigment that absorbs a visible light component contained in room light, and a second pigment that absorbs ultraviolet light, wherein the second pigment absorbs the ultraviolet light contained in sunlight, and varies the color imparted by a remaining visible light component unabsorbed by the first pigment absorbing the visible light component of the sunlight, the color being varied in such a manner as to reduce the absolute value of a color difference on a chromaticity diagram between a white point and a point indicative of the color imparted by the remaining component.

2. The screen according to claim 1, wherein the second pigment absorbs the ultraviolet light, and emits light of a waveband responsible for a complementary color of the color imparted by the remaining component.

3. The screen according to claim 1, wherein the second pigment absorbs the ultraviolet light, and absorbs light of a wavelength of the same waveband as the waveband responsible for the color imparted by the remaining component.

4. The screen according to claim 1, wherein the first pigment, and the second pigment after absorbing the ultraviolet light have absorption peaks different from a peak wavelength of light emitted by a projector projecting an image on the screen.

5. The screen according to claim 1, wherein the pigmented layer includes a first pigmented layer that includes the first pigment, and a second pigmented layer that includes the second pigment.

6. The screen according to claim 1, further comprising between the base material and the pigmented layer a light diffusing layer that diffuses incident light.

7. A projection system comprising:
the screen of claim 1; and
a projector that projects an image on the screen using a light source that has an emission peak at a wavelength different from any of a plurality of peak wavelengths in an emission spectrum of room light.

8. A screen comprising:
a base material; and
a pigmented layer provided on one surface of the base material,
the pigmented layer including:
a first pigment that absorbs a visible light component, the visible light component absorbed by the first pigment being a part of all visible light, and
a second pigment that emits light of a waveband responsible for a complementary color of the color imparted by a remaining component unabsorbed by the first pigment.

9. The screen according to claim 8, wherein the second pigment emits the light of the waveband by absorbing ultraviolet light.

10. The screen according to claim 8, wherein the pigmented layer includes a first pigmented layer that includes the first pigment, and a second pigmented layer that includes the second pigment.

11. The screen according to claim 2, wherein the second pigment emits the light of the waveband in response to absorbing the ultraviolet light.

12. The screen according to claim 11, wherein the second pigment emits the light of the waveband through fluorescence.

13. The screen according to claim 8, wherein the second pigment emits the light of the waveband in response to absorbing ultraviolet light.

14. The screen according to claim 12, wherein the second pigment emits the light of the waveband through fluorescence.

* * * * *